B. F. Sanford
Jaw Trap
N° 51356.  Patented Dec. 5, 1865.
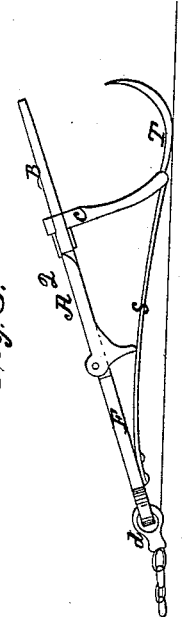
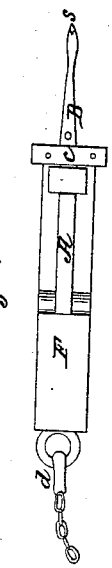
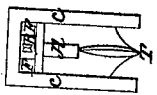
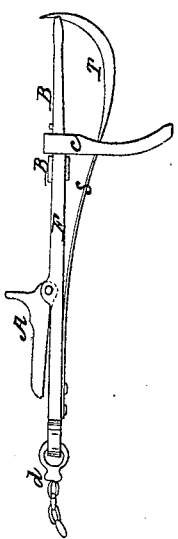
Witnesses.
Inventor.
B. F. Sanford

UNITED STATES PATENT OFFICE.

BENJAMIN F. SANFORD, OF GALESBURG, ILLINOIS.

IMPROVEMENT IN ANIMAL-TRAPS.

Specification forming part of Letters Patent No. 51,356, dated December 5, 1865.

*To all whom it may concern:*

Be it known that I, BENJAMIN F. SANFORD, of Galesburg, Knox county, Illinois, have invented a new and Improved Trap for Catching any Animal Which Takes Bait; and I do hereby declare that the following is a full and exact description thereof, reference being had to the accompanying drawings, and to the figures and letters of reference marked thereon.

To enable others to make and use my invention, I will proceed to describe its construction and operation.

Figure 1 is a top view. Fig. 2 is a side view. Fig. 3 is a side view of trap set. Fig. 4 is an end view.

Letter F is the bed-piece. C C are the legs. S is a spring with hook or knife. B is a spindle. A is a dog. d is a chain.

The bed-plate F is made either of metal or wood by having one end solid, the other end open. The legs C C are one piece, which is bent so as to pass over the open end of bed-plate F. At the end which is open, and on the lower side, is fastened a small plate, which leaves an opening, into which the spindle B passes. At one end of spring S is made a hook, which is fastened at the rear end of the bed-plate, the other end free. The dog A is attached by a pivot. At the end of bed-plate is a hole to attach a chain to.

To operate the trap is to set it with the legs C C down upon a smooth surface, then press down the spring S, pulling forward the spindle B, then pushing the dog A under the end of spindle B, then press back the spindle until it catches over the end of dog A, then the trap is set. The bait is placed upon the point or end of spindle B, then by drawing spindle B the trap is sprung, which passes the hook or knife through the lower jaw of the animal, thereby making it secure.

What I claim as my invention, and desire to secure by Letters Patent, is—

The combination of bed-plate F, legs C, spring S, spindle B, dog A, in the manner and substantially as set forth in the above specification.

B. F. SANFORD.

Witnesses:
 JNO. C. STEWART,
 C. M. CARR.